United States Patent [19]
McCarthy

[11] 3,797,960
[45] Mar. 19, 1974

[54] ELECTRICALLY INSULATED CHUCK FOR HAND-HELD DRILLS

[75] Inventor: Donald J. McCarthy, Wethersfield, Conn.

[73] Assignee: The Jacobs Manufacturing Company, West Hartford, Conn.

[22] Filed: Feb. 23, 1972

[21] Appl. No.: 228,561

[52] U.S. Cl.............. 408/240, 408/710, 279/1 Q, 174/138 D
[51] Int. Cl............................................ B23b 31/12
[58] Field of Search...... 279/1 Q, 60; 408/710, 240; 310/50, 47; 174/138 D

[56] References Cited
UNITED STATES PATENTS

| | | | |
|---|---|---|---|
| 3,685,843 | 8/1972 | Jacyno | 279/1 Q |
| 3,242,998 | 3/1966 | Gubbins | 310/50 X |
| 3,457,438 | 7/1969 | Badcock | 310/50 |

Primary Examiner—Gil Weidenfeld
Attorney, Agent, or Firm—Stephen J. Rudy

[57] ABSTRACT

A chuck including a rotatable metal body carrying jaws that are adjustable for holding a work bit. The body has a metal insert press fitted into a cavity for drivably coupling the body to the spindle of a hand-held drill. A coating of nylon plastics over the outer surface of the insert electrically insulates the body of the chuck from the insert and, as a consequence, from the spindle.

In a further embodiment, the spindle itself is coated with the nylon plastics material and is press fitted into the body of the chuck.

2 Claims, 5 Drawing Figures

PATENTED MAR 19 1974  3,797,960

ELECTRICALLY INSULATED CHUCK FOR HAND-HELD DRILLS

BACKGROUND OF THE INVENTION

This invention is concerned with an electrically insulated chuck for drills of the hand-held type.

Conventional portable, hand-held drills have a housing containing a rotary motor for driving a spindle carrying a chuck. The chuck and spindle as well as the housing are formed of electrically conductive material. In operating a conventional hand-held drill, there is a possibility that the chuck, or the work tool carried by the chuck, may strike a live electrical wire. A consequence of such an accident could be the passing of a dangerous current from the chuck through the spindle and housing to the operator.

The objective of this invention is to provide a solution to this problem by insulating in a practical manner the chuck from the spindle so that an electrical current cannot pass from one to the other.

In accordance with the invention, I have provided a chuck which is attachable to the spindle of a rotary tool by means of an insert member of the chuck which is electrically insulated from the rest of the chuck.

DESCRIPTION OF PREFERRED EMBODIMENT

Figure 1:
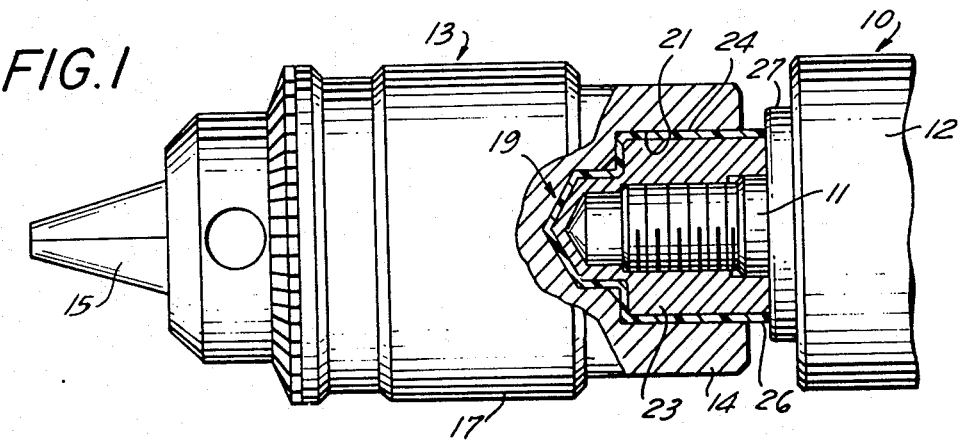
FIG. 1 illustrates a chuck embodying the invention mounted upon the spindle of a power tool, the chuck is shown broken away in part to better disclose its coupled relation to the spindle.
Figure 2:
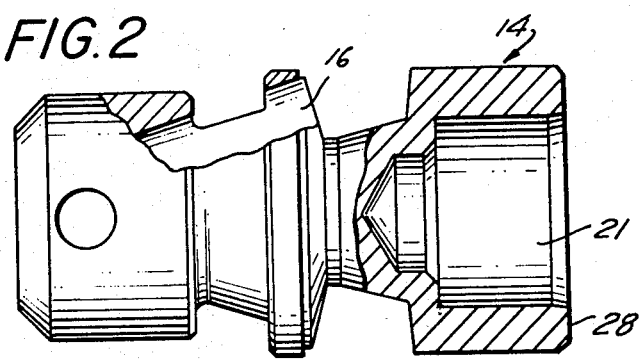
FIG. 2 is a fragmentary detail of the rear portion of the body of the chuck without the insert.

In the accompanying drawing illustrating the invention, there is disclosed a conventional power tool 10 of the hand-held type having a motor driven spindle 11 supported in a housing 12 for driving a chuck 13. Only so much of the power tool 10 is shown as required to provide an adequate understanding of the invention. The metal spindle 11 is rotatably supported in the usual metal bearing (not shown) supported by the metal housing 12. Accordingly, the spindle is capable of conducting an electrical current to the housing, as well as to other internal metal components of the tool.

The chuck 13 includes a body member 14 having the usual inclined jaw tracks 16. Jaws 15 are caused (in conventional manner) to slide in the tracks to and from gripping relation with a work element (not shown) upon actuation of a rotatable sleeve nut 17. The latter has an internal threaded engagement with the jaws for this purpose. The body of the chuck, as well as the jaws, and sleeve nut, are formed of metal. Accordingly, an electrical current could be passed from the jaws or sleeve nut to the body of the chuck.

Means is provided for drivingly connecting the body of the chuck with the spindle and for electrically insulating it from the spindle. This means is defined by an insert 19 fixed to, and made unitary with, the body of the chuck. The insert is tightly press fitted into a cavity 21 extending axially into the rear end of the body of the chuck. The insert has an axially extending threaded bore 22 in which the threaded end of the spindle 11 is engageable.

To ensure a non-failing strong threaded connection with the spindle, the insert has a metal body 23. The body of the insert is provided with a thin surface coating or film 24 of electrically non-conductive plastics material, such as nylon. The nylon coating effectively insulates the body 14 of the chuck electrically from the body of the insert and, as a consequence, from the spindle 11 connected to the insert.

The nylon coating covers over the entire outer surface area of the insert with the exception of its rear face 25 so that the entire wall area of the cavity 21 in the chuck body is separated from the metal body of the insert by the nylon coating.

While it is not needed to coat the rear face 25 of the insert with the insulating material, nevertheless, the entire outside surface of the insert may be coated.

It has been found that a nylon coating from 0.005 to 0.015 in thickness provides satisfactory insulating characteristics. The coating is adhered or bonded to the insert. This may be done in any suitable manner. For example, it may be done by initially heating the insert to a proper temperature and then spraying it with the plastics material so as to cause the latter to adhere in bonded relation to the insert.

The insert is shown as projecting axially beyond the rear face of the body of the chuck, as at 26. This projecting end ensures against contact being made between any part of the spindle and the body of the chuck. The projecting end of the insert serves as an abutment or spacer against which a collar 27 on the spindle may be brought without coming into contact with the adjacent end face of the body 14 of the chuck. It also serves to space the nose of the tool's housing 12 a desirable distance from the chuck so as to prevent spark jumping.

It is also to be noted that the bore 22 in the insert does not open through the front end of the insert so that the insulated forward end of the insert blocks communication of the bore with the bottom of the cavity. This is of advantage in that the spindle is prevented from being exposed through the insert to the bottom of the cavity and any foreign metal particles that might have attained access to the cavity are prevented from contacting the spindle.

While the coating of insulating material is shown as applied to the insert, it is understandable that it could be applied to cover the internal wall of the cavity 21 as well as the rear end face 28 of the body of the chuck.

Figure 5:
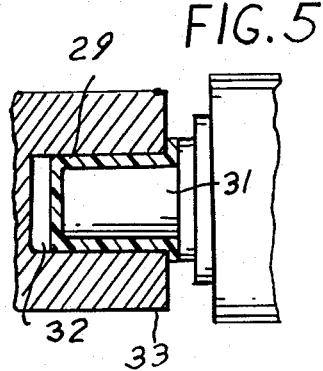
FIG. 5 shows a further embodiment of the invention.
Figure 3:
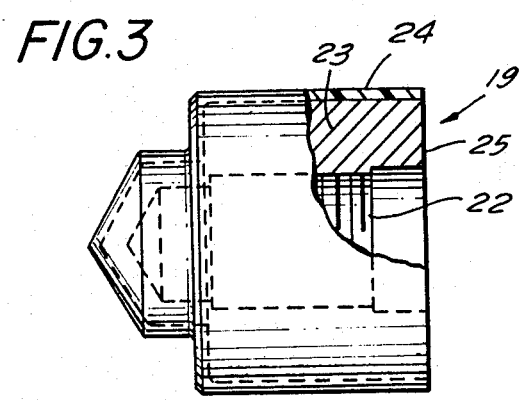
FIG. 3 is a detail of the insulated insert element of the chuck.
Figure 4:
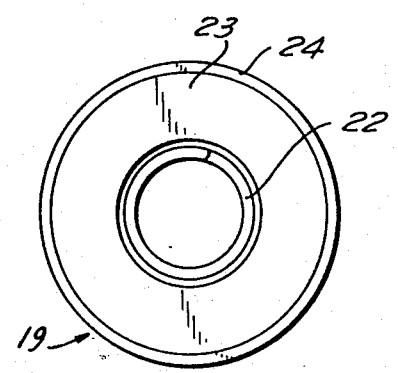
FIG. 4 is a right end view of FIG. 3.

In the FIG. 5 embodiment, the coating 29 of insulating material is shown as applied to the spindle 31 of the tool; and the spindle with the coating thereon is rigidly press fitted in an axial bore 32 of the body 33 of the chuck so that the body and spindle rotate as a unit.

I claim:

1. In a power tool including a housing supporting an electrically powered motor driven metal spindle, a tool chuck having a metal body formed with an axially extending cavity in its rear end, and coupling means for coupling the body of the chuck to the spindle, the coupling means comprising a metal bushing having a film of electrical insulating plastics bonded to its surface insulating the bushing from the wall of the cavity and formed with an axial bore in which the spindle is threadedly received, the bore extending only partway into the bushing, and the surface of said insulated metal bushing being of a predetermined size and of a shape complementary to the chuck cavity to have been received therein by a press fit.

2. In a power tool as in claim 1, wherein the bushing projects axially rearwardly from the body of the chuck into abutment with a metal collar on the spindle whereby an electrically insulating air gap is provided spacing the collar of the spindle from the rearmost part of the metal body of the chuck.

* * * * *